(12) United States Patent
Ganzel

(10) Patent No.: US 12,128,860 B2
(45) Date of Patent: Oct. 29, 2024

(54) HYDRAULIC BRAKE BOOST

(71) Applicant: ZF Active Safety US Inc., Livonia, MI (US)

(72) Inventor: Blaise Joseph Ganzel, Ann Arbor, MI (US)

(73) Assignee: ZF ACTIVE SAFETY US INC, Livonia, MI (US)

( * ) Notice: Subject to any disclaimer, the term of this patent is extended or adjusted under 35 U.S.C. 154(b) by 287 days.

(21) Appl. No.: 17/188,227

(22) Filed: Mar. 1, 2021

(65) Prior Publication Data
US 2022/0274575 A1 Sep. 1, 2022

(51) Int. Cl.
| | |
|---|---|
| *B60T 13/74* | (2006.01) |
| *B60T 7/04* | (2006.01) |
| *B60T 8/17* | (2006.01) |
| *B60T 8/176* | (2006.01) |
| *B60T 8/40* | (2006.01) |
| *B60T 11/16* | (2006.01) |
| *B60T 13/14* | (2006.01) |
| *B60T 13/58* | (2006.01) |
| *B60T 13/68* | (2006.01) |
| *B60T 15/02* | (2006.01) |
| *B60T 17/22* | (2006.01) |

(Continued)

(52) U.S. Cl.
CPC ............ *B60T 13/588* (2013.01); *B60T 7/042* (2013.01); *B60T 8/17* (2013.01); *B60T 8/176* (2013.01); *B60T 8/409* (2013.01); *B60T 11/165* (2013.01); *B60T 13/147* (2013.01); *B60T 13/686* (2013.01); *B60T 13/746* (2013.01); *B60T 15/028* (2013.01); *B60T 17/221* (2013.01); *G05D 16/0404* (2019.01); *B60T 2270/10* (2013.01); *B60T 2270/402* (2013.01); *B60T 2270/404* (2013.01); *B60T 2270/406* (2013.01); *B60T 2270/82* (2013.01); *F16K 11/07* (2013.01)

(58) Field of Classification Search
None
See application file for complete search history.

(56) References Cited

U.S. PATENT DOCUMENTS

| 2004/0135432 | A1* | 7/2004 | Reuter | .................. B60T 8/4081 303/152 |
|---|---|---|---|---|
| 2011/0185723 | A1* | 8/2011 | Ganzel | .................... B60T 7/042 60/547.1 |

(Continued)

*Primary Examiner* — Bradley T King
(74) *Attorney, Agent, or Firm* — Kristin L. Murphy

(57) ABSTRACT

A brake system for actuating front and rear wheel brakes includes a reservoir and a master cylinder operable by actuation of a brake pedal connected to the master cylinder to generate brake actuating pressure at a first output for hydraulically actuating the front wheel brakes. A power transmission unit is configured for selectively providing pressurized hydraulic fluid for actuating the front wheel brakes. A pair of rear brake motors selectively electrically actuate respective rear wheel brakes. An electronic control unit controls at least one of the power transmission unit and the rear brake motors. A two-position three-way valve is hydraulically connected with the master cylinder and the power transmission unit and with the front wheel brakes. The three-way valve selectively controls hydraulic fluid flow from a chosen one of the master cylinder and the power transmission unit to at least one of the front wheel brakes.

13 Claims, 11 Drawing Sheets

(51) Int. Cl.
    *G05D 16/04*        (2006.01)
    *F16K 11/07*        (2006.01)

(56) References Cited

U.S. PATENT DOCUMENTS

| | | | |
|---|---|---|---|
| 2013/0234501 A1* | 9/2013 | Leiber | B60T 8/4081 |
| | | | 303/10 |
| 2013/0261917 A1* | 10/2013 | Kotake | F16D 65/183 |
| | | | 701/70 |
| 2014/0131154 A1* | 5/2014 | Ganzel | B60T 13/588 |
| | | | 303/14 |
| 2014/0265547 A1* | 9/2014 | Ganzel | B60T 13/745 |
| | | | 303/66 |
| 2015/0166030 A1* | 6/2015 | Kobayashi | B60T 13/58 |
| | | | 303/14 |
| 2015/0274144 A1* | 10/2015 | Tokoi | F16K 31/0665 |
| | | | 303/3 |
| 2016/0016571 A1* | 1/2016 | Ganzel | B60T 7/042 |
| | | | 303/66 |
| 2016/0207512 A1* | 7/2016 | Komaba | B60T 7/042 |
| 2017/0282882 A1* | 10/2017 | Takahashi | B60T 15/00 |
| 2017/0297549 A1* | 10/2017 | Huang | B60T 13/745 |
| 2019/0135252 A1* | 5/2019 | Starr | B60T 8/368 |
| 2019/0178410 A1* | 6/2019 | Kurz | F16K 31/0675 |
| 2019/0248348 A1* | 8/2019 | Ganzel | B60T 13/745 |
| 2020/0070793 A1* | 3/2020 | Yu | B60T 8/3265 |

\* cited by examiner

HYDRAULIC BRAKE BOOST

TECHNICAL FIELD

This disclosure relates to an apparatus and method for use of a brake system and, more particularly, to a method and apparatus of a hydraulic brake system supplying hydraulic push-through or boost to the front brakes only via use of two-position three-way valve.

BACKGROUND

A brake system may include anti-lock control including a pedal-operated hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 2020 to Blaise Ganzel and titled "Vehicle Brake System with Auxiliary Pressure Source", and in U.S. Patent Application Publication No. 2020/0307538, published 1 Oct. 2020 by Blaise Ganzel and titled "Brake System with Multiple Pressure Sources", both of which are incorporated herein by reference in their entirety for all purposes.

SUMMARY

In an aspect, a brake system for actuating a pair of front wheel brakes and a pair of rear wheel brakes is disclosed. The system includes a reservoir and a master cylinder operable during a manual push-through mode by actuation of a brake pedal connected to the master cylinder to generate brake actuating pressure at a first output for hydraulically actuating the pair of front wheel brakes. A power transmission unit is configured for selectively providing pressurized hydraulic fluid for actuating the pair of front wheel brakes during a braking event. A pair of rear brake motors selectively electrically actuate respective rear wheel brakes. An electronic control unit controls at least one of the power transmission unit and the pair of rear brake motors. A pedal simulator is in selective fluid communication with the master cylinder for providing predetermined brake pedal response. A two-position three-way valve is hydraulically connected with the master cylinder and the power transmission unit and with the front wheel brakes. The three-way valve selectively controls hydraulic fluid flow from a chosen one of the master cylinder and the power transmission unit to at least one of the pair of front wheel brakes.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
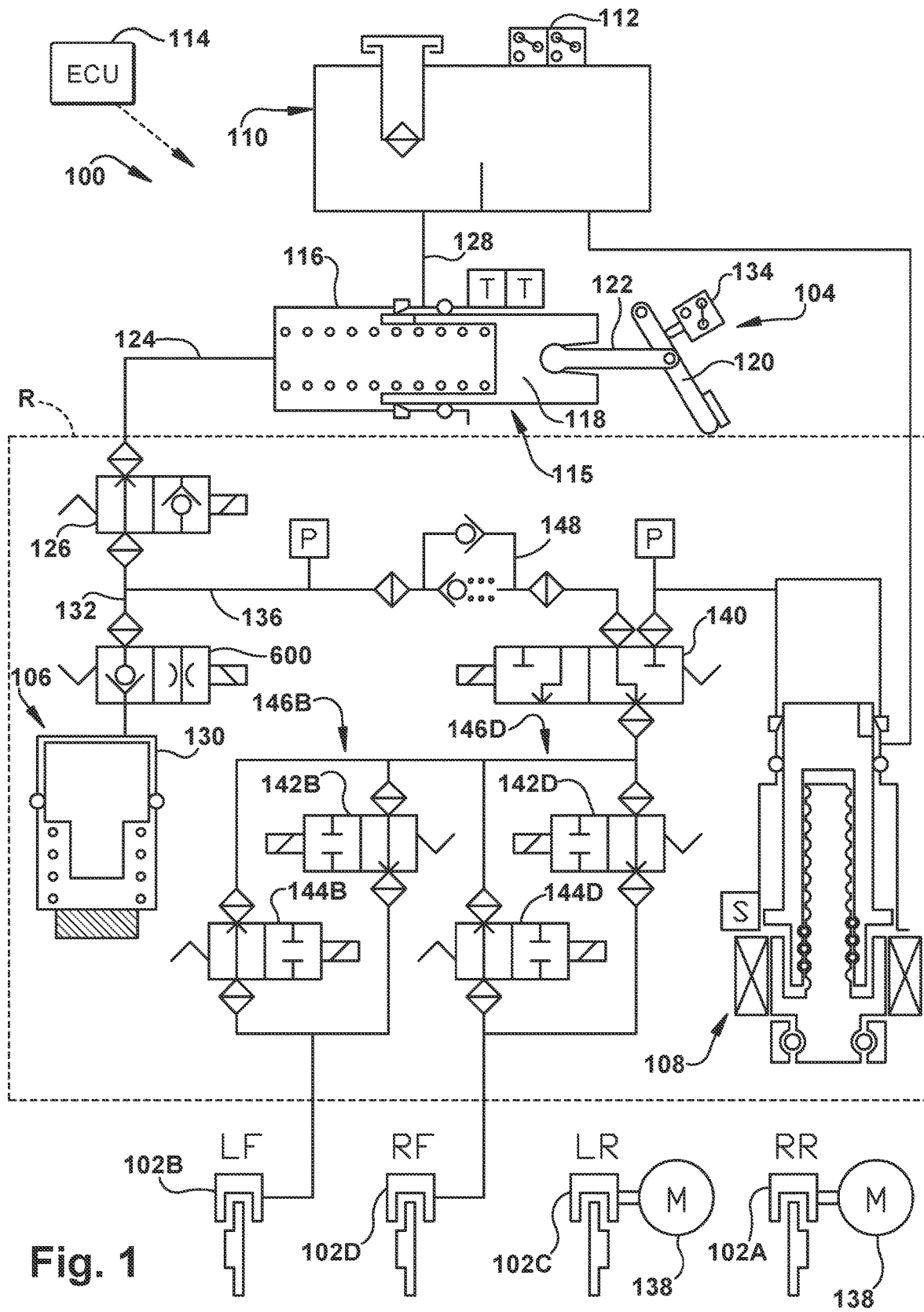
FIG. 1 is a schematic hydraulic diagram of a brake system according to an aspect of the present invention, in a first configuration.

FIG. 1 depicts a brake system 100 for actuating a pair of front wheel brakes and a pair of rear wheel brakes, in a first configuration. The brake system 100 is shown here as a hydraulic boost braking system in which boosted fluid pressure is utilized to apply braking forces for the brake system 100. The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings. The block or housing may be made from solid material, such as aluminum, that has been drilled, machined, or otherwise formed to house the various components. Fluid conduits may also be formed in the block or housing.

In the illustrated embodiment of the brake system 100, there are four wheel brakes 102A, 1028, 102C, and 102D. The wheel brakes 102A, 1028, 102C, and 102D can have any suitable wheel brake structure operated electrically and/or by the application of pressurized brake fluid. Each of the wheel brakes 102A, 1028, 102C, and 102D may include, for example, a brake caliper mounted on the vehicle to engage a frictional element (such as a brake disc) that rotates with a vehicle wheel to effect braking of the associated vehicle wheel. The wheel brakes 102A, 1028, 102C, and 102D can be associated with any combination of front and rear wheels of the vehicle in which the brake system 100 is installed. For example, the brake system 100 may be configured as a front/rear split system, as shown, such that a master cylinder pressure circuit is associated with providing fluid to the front wheel brakes 1028 and 102D. A second master cylinder pressure circuit (not shown) may associated with providing fluid to the rear wheel brakes 102A and 102C, when the rear wheel brakes 102A and 102C are hydraulically operated, or the rear wheel brakes 102A and 102C may be electrically operated, as shown and described herein.

In this example, the wheel brake 102A may be associated with a right rear wheel of the vehicle in which the brake system 100 is installed, and the wheel brake 102B may be associated with the left front wheel. The wheel brake 102C may be associated with the left rear wheel, and the wheel brake 102D may be associated with the right front wheel. Alternatively, though not depicted here, the brake system 10 may be configured as a diagonal split brake system such that the wheel brakes 102A and 102B are associated with wheels at the front or rear axle of the vehicle, and the wheel brakes 102C and 102D are associated with wheels at the other axle of the vehicle.

The brake system 100 generally includes a brake pedal unit, indicated generally at 104, a pedal simulator, indicated generally at 106, a power transmission unit (also known as a single acting plunger or a plunger assembly in some configurations), indicated generally at 108, and a fluid reservoir 110. The reservoir 110 stores and holds hydraulic fluid for the brake system 100. The fluid within the reservoir 110 is preferably held at or about atmospheric pressure, but the fluid may be stored at other pressures if desired. The reservoir 110 is shown schematically having two tanks or sections with fluid conduit lines connected thereto. The sections can be separated by several interior walls within the reservoir 110 and are provided to prevent complete drainage of the reservoir 110 in case one of the sections is depleted due to a leakage via one of the three lines connected to the reservoir 110. Alternatively, the reservoir 110 may include multiple separate housings. The reservoir 110 may include at least one fluid level sensor 112 for detecting the fluid level of one or more of the sections of the reservoir 110.

The power transmission unit 108 of the brake system 100 functions as a source of pressure to provide a desired pressure level to the hydraulically operated ones of the wheel brakes 102A, 102B, 102C, and 102D during a typical or normal brake apply. After a brake apply, fluid from the hydraulically operated ones of the wheel brakes 102A, 102B, 102C, and 102D may be returned to the power transmission unit 108 and/or diverted to the reservoir 110. In the depicted embodiment, the power transmission unit 108 is a single acting plunger assembly. It is also contemplated that other configurations (not shown) of the brake system 100 could include hydraulic control of all four wheels, or of the rear wheels instead of the front wheels (which would then be electrically controlled/actuated). One of ordinary skill in the art would be readily able to provide such an arrangement for a desired use environment, following aspects of the present invention.

The brake system 100 also includes at least one electronic control unit ("ECU") 114. The ECU 114 may include microprocessors and other electrical circuitry. The ECU 114 receives various signals, processes signals, and controls the operation of various electrical components of the brake system 100 in response to the received signals. The ECU 114 can be connected to various sensors such as the reservoir fluid level sensor 112, pressure sensors, travel sensors, switches, wheel speed sensors, and steering angle sensors. The ECU 114 may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECU 114 may be connected to the instrument cluster for collecting and supplying information related to warning indicators such as an ABS warning light, a brake fluid level warning light, and a traction control/vehicle stability control indicator light.

As shown schematically in FIG. 1, the brake pedal unit 104 includes a master cylinder 115 with a housing 116 for slidably receiving various cylindrical pistons and other components therein. Note that the housing is not specifically schematically shown in the Figures, but instead the walls of the longitudinally extending bore are schematically illustrated. The housing 116 may be formed as a single unit or include two or more separately formed portions coupled together. An retainer 118 is connected with a brake pedal 120 via a linkage arm 122. Leftward movement of the retainer 118 may cause, under certain conditions, a pressure increase within the master cylinder 115.

The pedal simulator 106 is in selective fluid communication with the master cylinder 115 for providing predetermined brake pedal response. As shown, the pedal simulator 106 is connected to the master cylinder 115 via one or more hydraulic passages, but it is contemplated that the "selective fluid communication" could be provided via integration of the pedal simulator 106 into the master cylinder 115.

More specifically, the master cylinder 115 is in fluid communication with the pedal simulator 106 via a master cylinder passage 124. The retainer 118 is slidably disposed in the bore of the housing 116 of the master cylinder 115. When the brake pedal unit 104 is in its rest position (the driver is not depressing the brake pedal 120), the structures of the master cylinder 115 permit fluid communication between the bore of the housing 116 and the reservoir 110 via a reservoir conduit 128. The pedal simulator 106 is therefore in selective fluid communication with the master cylinder 115 for providing predetermined brake pedal 120 response to the driver (e.g., brake pedal "feel").

The brake system 100 may further include an optional solenoid actuated simulator test valve 126 which may be electronically controlled between an open position and a powered closed position, and which is located fluidly between the reservoir 110 and the master cylinder 115. The simulator test valve 126 may not be needed during a normal brake apply or for a manual push-through mode. The simulator test valve 126 can be actuated to resist opening under predetermined pressure(s) during various testing modes to determine the correct operation of other components of the brake system 100. For example, the simulator test valve 126 may be actuated to a closed position to prevent venting to the reservoir 110 via the reservoir conduit 128 to monitor fluid flow to determine whether leaks may be occurring through seals of various components of the brake system 100.

A simulation pressure chamber 130 of the pedal simulator 106 is in fluid communication with the pedal simulator passage 132, which is in fluid communication with the master cylinder 115 of the brake pedal unit 104 via simulator valve 600 (an example configuration of which is set forth below). One example of desired operation of the simulator valve—either a known simulator valve or that discussed in more detail below as 600—is during a failed and/or initial/startup condition, in which the brake pedal unit 104 is utilized to provide a source of pressurized fluid to the hydraulically operated ones of the wheel brakes 102A, 102B, 102C, and 102D in a push-through manner, as described herein.

It is contemplated that the brake system 100 could include at least two hydraulically operated wheel brakes 102A, 102B, 102C, and 102D. For example, the two front wheel brakes 102B and 102D, the two front wheel brakes 102A and 102C, or either front wheel brake 102B or 102D and one rear wheel brake 102A or 102C, could constitute a "pair" of hydraulically operated wheel brakes 102A, 102B, 102C, and 102D. In the below description of FIG. 1, a pair of front wheel brakes 102B and 102D are used as an example, though one of ordinary skill in the art will be able to provide a suitable brake system 100 according to aspects of the present invention for any combination of two or more hydraulically-operated wheel brakes 102A, 102B, 102C, and 102D.

The brake pedal unit 104 is connected to the brake pedal 120 and is actuated by the driver of the vehicle as the driver presses on the brake pedal 120. A brake sensor or switch 134 may be electrically connected to the ECU 114 to provide a signal indicating a depression of the brake pedal 120. The brake pedal unit 104 may be used as a back-up source of pressurized fluid to essentially replace the normally supplied source of pressurized fluid from the power transmission unit 108 under certain failed conditions of the brake system 100, and/or upon initial startup of the brake system 100. This situation is referred to as a manual push-through event, or a "manual apply".

The brake pedal unit 104 can supply pressurized fluid to a master cylinder output 136, which is then routed to the hydraulically operated ones of the wheel brakes 102A, 102B, 102C, and 102D as desired. This flow is pushed through, largely under mechanical pressure upon the brake pedal 120 from the driver's foot, from the master cylinder 115. That is, the master cylinder 115 is operable during a manual push-through mode by actuation of the brake pedal 120 connected to the master cylinder 115 to generate brake actuating pressure at a first output (here, schematically shown as master cylinder output 136) for hydraulically actuating the hydraulically-actuated ones of the brakes.

As shown in the Figures, a pair of rear brake motors 138 may be provided for selectively electrically actuating respective rear wheel brakes 102A and 102C. Therefore, except as noted otherwise or obvious from context, the pair of front wheel brakes 102B and 102D are presumed herein to be hydraulically powered, and the pair of rear wheel brakes 102A and 102C are presumed herein to be electrically powered, though it is contemplated that the wheel brakes 102A, 102B, 102C, and 102D could each be powered electrically and/or hydraulically—for example, the front wheel brakes 102B and 102D could be electrically powered and the rear wheel brakes 102A and 102C could be hydraulically powered, and/or at least one of the wheel brakes 102A, 102B, 102C, and 102D could be powered electrically during certain phases of operation and hydraulically during other phases of operation, of the same brake system 100. It is also contemplated that one or more hydraulically and/or electrically powered parking brakes (not shown) could be provided to any of the wheels of the vehicle, as desired. Additionally, it is contemplated that a braking signal could be generated electronically by the brake pedal unit 104 via, for example, one or more travel sensors "T" and transmitted, in any suitable manner, to other portions of the brake system 100.

A power transmission unit 108 is configured for selectively providing pressurized hydraulic fluid for actuating the pair of front wheel brakes 102B and 102D during a braking event. The electronic control unit 114 controls at least one of the power transmission unit 108 and the pair of rear brake motors 138.

A two-position three-way valve 140 is hydraulically connected with the master cylinder 115 and the power transmission unit 108 and with the front wheel brakes 102B and 102D. The three-way valve 140 selectively controls hydraulic fluid flow from a chosen one of the master cylinder 115 and the power transmission unit 108 to at least one of the front wheel brakes 102B and 102D. Through use of the three-way valve 140, hydraulic fluid can be routed to the front wheel brakes 102B and 102D in a desired manner (from either the master cylinder 115 or the power transmission unit 108) to assist with boosted braking control and provide desired response times and efficient pressure flow to the front wheel brakes 102B and 102D. A single three-way valve 140 is used here instead of one normally-closed valve and one normally-open valve for cost and packaging reasons, but also to reduce current draw. This is mainly due to the fact that the normally-open valve would need an undesirably high force spring to avoid it becoming hydraulically locked closed if power is lost during a boosted brake apply, which could trap brake pressure and/or cause unwanted braking when the pedal is released.

It is contemplated that at least the three-way valve 140, the pedal simulator 106, and the power transmission unit 108, along with their related sensors, hydraulic lines, valves, and the like, may be located remotely from the reservoir 112, the master cylinder 115, and the pair of front wheel brakes 102B and 102D. One example of the group of components that could be located remotely, therefore freeing up underhood space adjacent the vehicle firewall, is delineated by dashed line R in FIG. 1. The term "located remotely" is used herein to indicate spacing significantly apart and outside any common housing, such as by placing the components inside dashed line R at a position in the vehicle which is separated from the reservoir 110 and the master cylinder 115.

Multiplex control of each of the pair of front wheel brakes 102B and 102D may be provided by an arrangement of first and second parallel valves 142 and 144, respectively. The first and second parallel valves 142 and 144 could be, for example, of the isolation valve type. The first and second parallel valves 142 and 144 could be substantially similar in configuration to each other, or could include some differences. One of ordinary skill in the art will readily be able to provide suitable first and second parallel valves 142 and 144 for a desired use environment of the present invention.

Here, for clarity in some Figures, the first and second parallel valves 142 and 144 are appended with the letter "B" or "D", referencing a respective front wheel brake 102B and 102D, with which the so-labeled valves are respectively associated. A chosen one of the first and second parallel valves 142 and 144 receives input from an output of the other one of the first and second parallel valves 142 and 144. Together, the first and second parallel valves 142 and 144, when used in the "reverse plumbed" fashion shown in the Figures to provide multiplex control of the front brakes, will be referenced as a multiplex valve arrangement 146 (again, with an appended "B" or "D", when associated with a particular one of the front wheel brakes 102B and 102D).

The multiplex control facilitated by the multiplex valve arrangement 146 selectively provides, for example, slip control or traction compensation to at least one of the pair of front wheel brakes 102B and 102D. Multiplex control of the front wheel brakes 102B and 102D is provided by an arrangement of first and second parallel valves 142 and 144, with a chosen one of the first and second parallel valves 142 or 144 receiving input from the three-way valve 140 and output to a selected one of the pair of front wheel brakes 102B or 102D, and the other of the first and second parallel valves 142 or 144 receiving input from the selected one of the pair of front wheel brakes 102B or 102D and output to the three-way valve 140. In this manner, the fluid pressures at each of the front wheel brakes 102B and 102D can be controlled independently from one another even though the brake system 100 may include a single source of pressure (e.g., power transmission unit 108 and/or master cylinder 115).

Thus, the multiplex valve arrangement 146 downstream of the pressure source includes first and second parallel valves 142 and 144 which are controlled between their open and closed positions to provide different braking pressures within the front wheel brakes 102B and 102D, as desired for a particular braking situation. The multiplex valve arrangement 146, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking.

FIG. 1 also depicts a bypass valve 148, including a check valve, which is located fluidically between the three-way valve 140 and the master cylinder 115. (This may also result in the bypass valve 148 being located fluidically between the three-way valve 140 and the pedal simulator 106.) When present, the bypass valve 148 may be provided to assist with leak-down of the system (that is, an undesired loss of fluid pressure within the brake system 100 and potential loss of fluid from the reservoir 110 and/or from the master cylinder 115) in a situation where one or more of the hydraulically actuated ones of the front and rear wheel brakes 102A, 102B, 102C, and 102D develops a malfunction permitting release of hydraulic fluid outside the brake system. The cracking pressure of the relief valve 148 may be determined for a particular use environment of the brake system 100 to achieve desired continued usability of the boost function even after such a malfunction, potentially by isolating the malfunctioning brake. The bypass valve 148 therefore prevents release of fluid from the reservoir 110 and/or the master cylinder 115 in the arrangements depicted in FIGS. 1-2 when at least one front wheel brake 102B or 102D is in a failure condition that releases fluid to ground.

Figure 2:
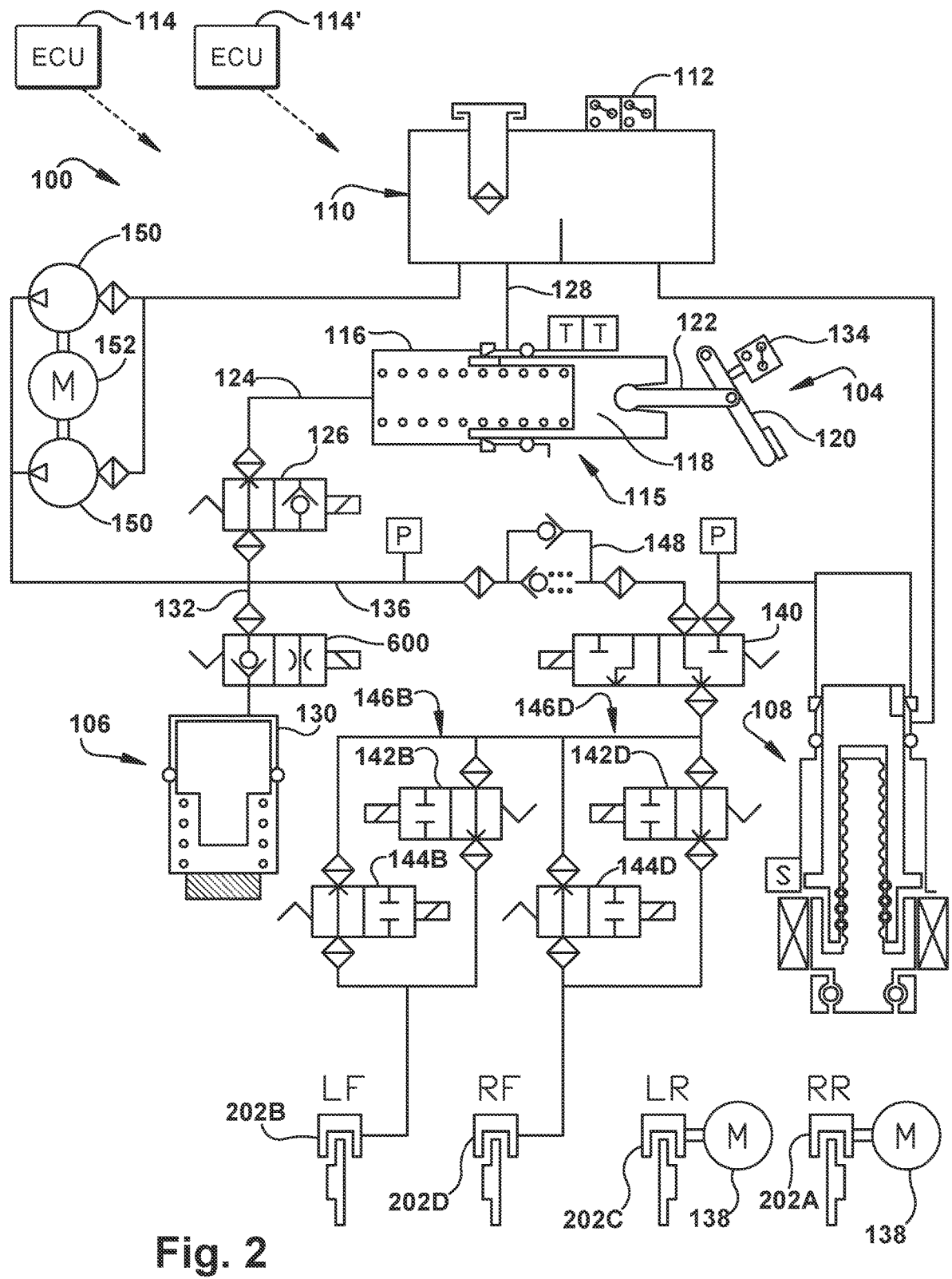
FIG. 2 is a schematic hydraulic diagram of the brake system of FIG. 1, in a second configuration.

With reference now to FIG. 2, a second configuration of the brake system 100 is depicted, parts or all of which can be used with other components of the present invention, as desired. Description of similar components and operation which is made elsewhere in this application will not necessarily be repeated for each and every described configuration or aspect of the brake system 100, for brevity, but should instead be considered to apply to like-numbered portions of other configurations as appropriate. In the arrangement of the brake system 100 shown in FIG. 2, the electronic control module 114 is a first electronic control module 114. The brake system 100 shown in FIG. 2 also includes a second electronic control module 114', which may be the same as, or different than, the first electronic control module 114. This arrangement may be useful, for example, for providing redundancy in the brake system, and/or for facilitating autonomous braking. It is contemplated, for example, that the master cylinder 115, brake pedal 120 and related structures, and the pedal simulator 106 and related structures, could be omitted from the brake system 100 otherwise shown in FIG. 2, for a truly autonomous brake arrangement. Another autonomous braking scheme is shown and described in, for example, in co-pending patent application U.S. patent application Ser. No. 17/188,288, filed concurrently herewith and titled "Apparatus and Method for Control of a Hydraulic Brake System", which is hereby incorporated by reference for all purposes.

In the arrangement shown in FIG. 2, a pair of pumps 150 are controlled by the second electronic control module 114' and powered by pump motor 152 to serve as a source of pressurized fluid also or instead of at least one of the master cylinder 115 and the power transmission unit 108 previously discussed. A chosen one of the first and second electronic control modules 114 and 114' may control the power transmission unit 108 and the pair of front wheel brakes 102B and 102D, and the other one of the first and second electronic control modules 114 and 114' may control the pair of rear wheel brakes 102A and 102C. Optionally, the simulator test valve 126 and/or any other desired sensors, valves, or other components of the brake system 100 could be controlled by the second electronic control module 114', along with the pumps 150, pump motor 152, and rear wheel brakes 102A and 102C. As shown, the other components of the brake system 100 in FIG. 2 are substantially similar to those shown in FIG. 1 and discussion of these is not repeated herein.

Figure 3:
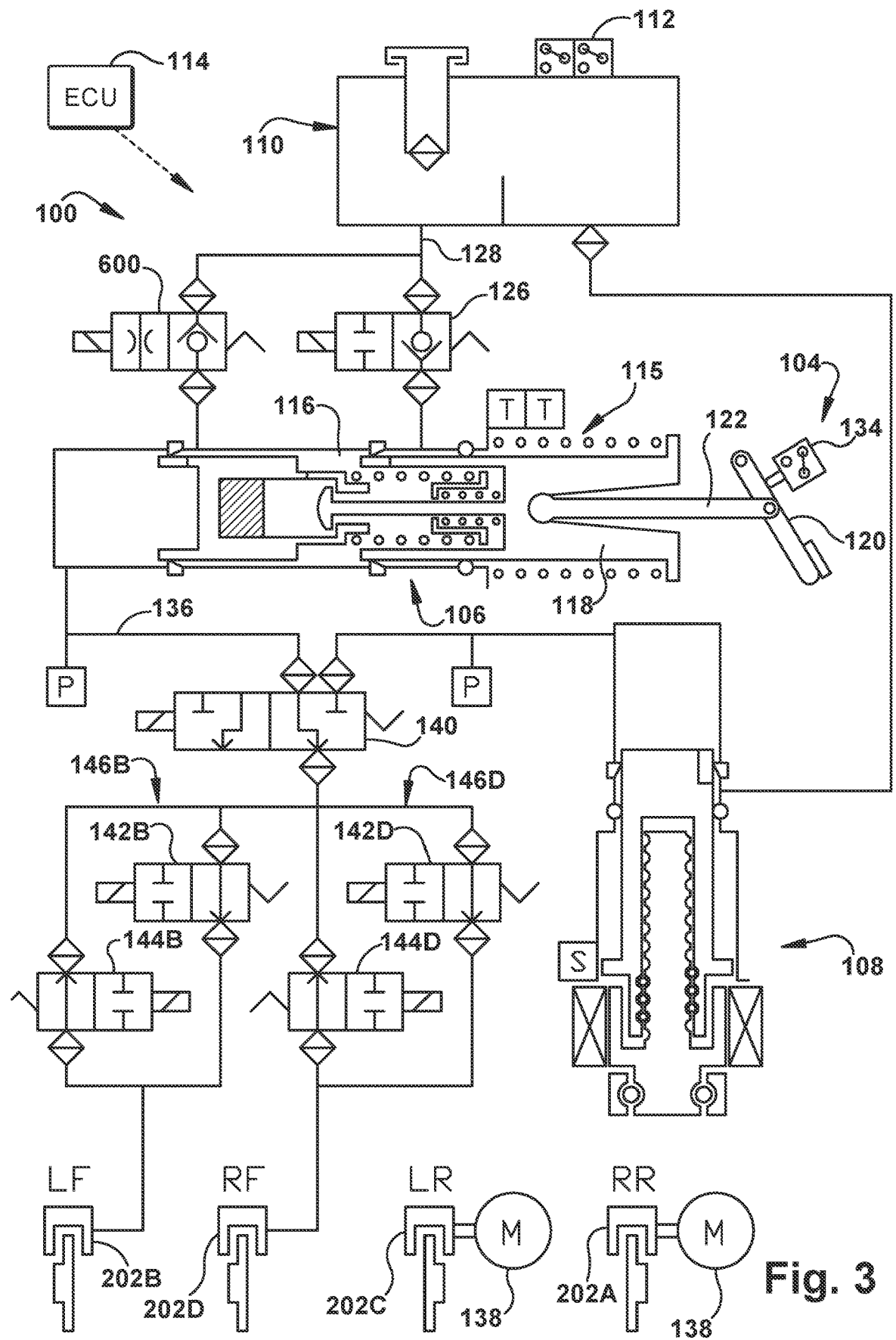
FIG. 3 is a schematic hydraulic diagram of the brake system of FIG. 1, in a third configuration.
Figure 4:
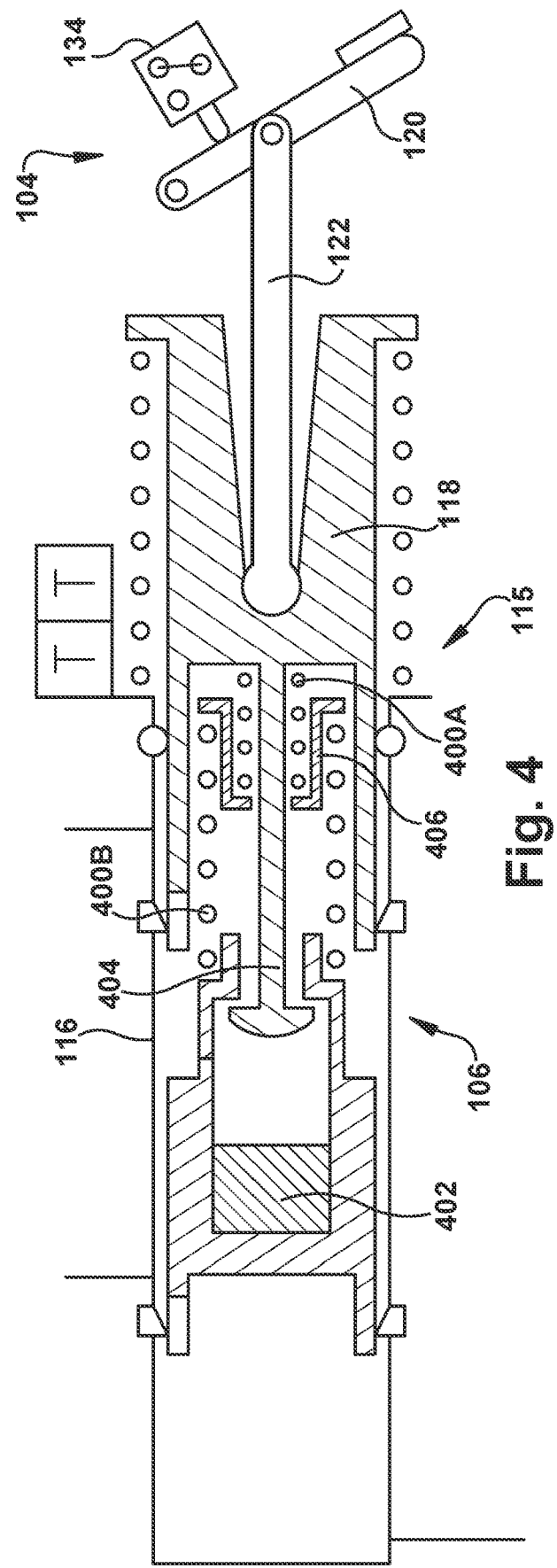
FIG. 4 is a schematic partial side view of a first component suitable for use in a brake system according to any aspect of the present invention.

Turning now to FIG. 3, the brake system 100 is depicted in a third configuration. In the brake system 100 of FIG. 3, the pedal simulator 106 is integrated into the master cylinder 115 by being at least partially enclosed within the housing 116 of the master cylinder 115 to create an integrated pedal simulator 106. This arrangement is shown schematically in FIG. 4 The integrated pedal simulator 106 is configured to provide a progressive force-versus-travel curve for the brake pedal 120 using a plurality of force-response springs, having any desired similar or different spring forces, with two different force-response springs 400A and 400B being shown and described herein with respect to the pedal simulator 106. As shown in FIG. 4, the integrated pedal simulator includes a resilient stop 402 against which a rounded-end piston 404 presses to cushion impact of the piston 404 during operation of the pedal simulator 106 portion of the master cylinder 115. The piston 404 is directly connected to the linkage arm 122 via the retainer 118. A spring retainer 406 maintains position of the lower-resistance force-response spring 400A, as shown.

In use, the driver pushes the brake pedal 120, which forces the linkage arm 122 toward the left, in the orientation of FIG. 4. The lower-resistance force-response spring 400A resists the pushing force until it is compressed to the point that the piston 404 directly or indirectly contacts the rightmost (in the orientation of FIG. 4, surface of the spring retainer 406). Once such contact is made, the spring retainer 406 moves in concert with the linkage arm 118 to further compress the higher-resistance force-response spring 400B within the housing 116 under maintained compressive force. In this manner, the integrated pedal simulator 106 provides a comfortable and expected "feel" to the brake pedal 120 for the driver. Should compressive force be maintained by the driver until the curved head of the piston 404 comes into contact with the resilient stop 402, that curved or spherical surface helps to spread the compressive force against the resilient stop 402, as well as avoid a jarring, sudden contact with the resilient stop 402 that a driver would likely find unpleasant and to mimic the feeling of vacuum booster runout.

Figure 5:
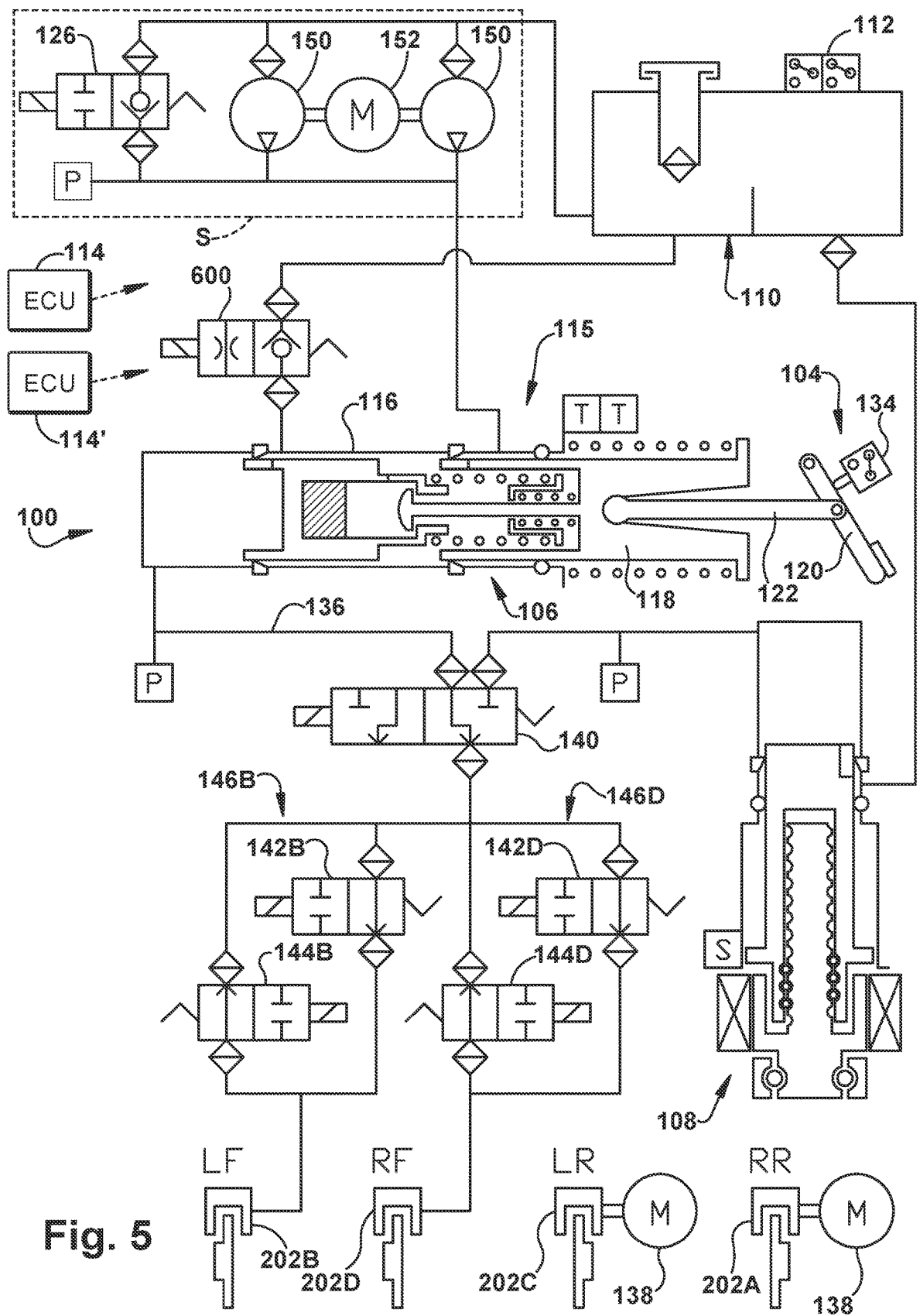
FIG. 5 is a schematic hydraulic diagram of the brake system of FIG. 1, in a fourth configuration.

FIG. 5 shows the previously described brake system 100 in a fourth configuration, including both an integrated pedal simulator 106 contained within a housing 116 of the master cylinder 115, and a second electronic control unit 114'. As symbolized by the dashed line "5", the pumps 150, pump motor 152, and simulator test valve 126 may be controlled by the second electronic control unit 114' in the configuration depicted in FIG. 2. Here as in the brake system 100 shown in FIG. 3, a pedal simulator valve 600 and pedal simulator test valve 126 have been moved upstream of the master cylinder 115. This arrangement may be facilitated, for example, when an anti-leak-down feature is built into the simulator test valve 126, rather than being the separate bypass valve 148 previously described.

Figure 6:
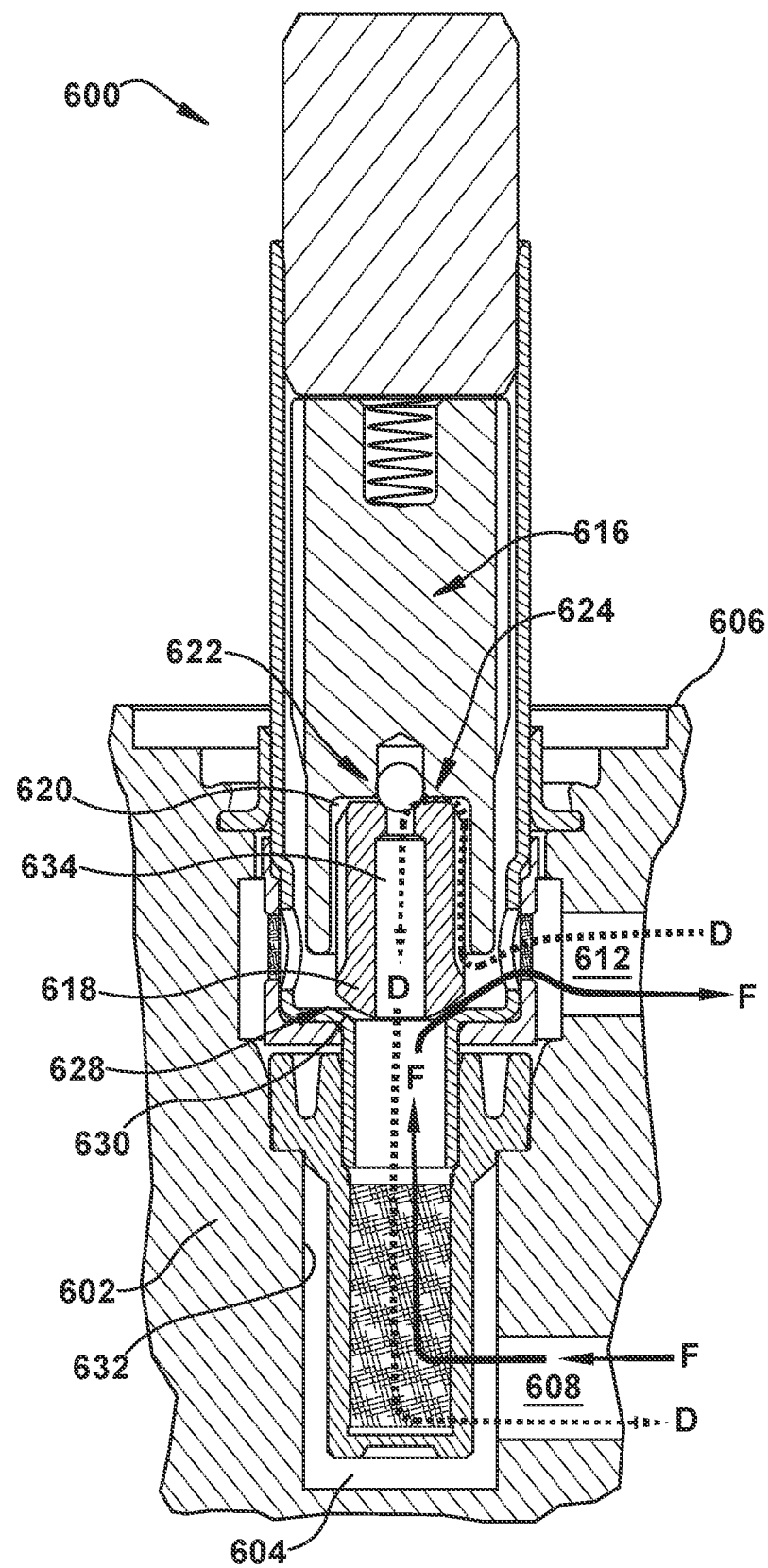
FIG. 6 is a schematic partial side view of a second component suitable for use in a brake system according to any aspect of the present invention.

FIGS. 6-10 are schematic depictions of certain components that could be used with various configurations of the brake system 100, similar to the depiction of the integrated pedal simulator 106 and master cylinder 115 in FIG. 4. FIG. 6, for example, schematically depicts a pedal simulator valve 600 similar to that shown and described in co-pending patent application U.S. patent application Ser. No. 17/188,152, filed concurrently herewith and titled "Simulator Valve", which is incorporated herein by reference in its entirety, for all purposes.

The pedal simulator valve 600 selectively permits fluid communication between the master cylinder 115 and a separate pedal simulator 106. The simulator valve 600 includes a housing 602 having a center bore 604 extending longitudinally from a first housing surface 606. The "longitudinal" direction is substantially vertical, in the orientation of FIG. 6. The housing 602 includes a pedal simulator passage 608 extending therethrough to at least partially place the center bore 604 in fluid communication with a pedal simulator 106. The housing 602 includes a master cylinder passage 612 extending therethrough to at least partially place the center bore 604 in fluid communication with a master cylinder 115. The master cylinder passage 612 is located longitudinally between the first housing surface 606 and the pedal simulator passage 608.

An armature 616 is located at least partially within the housing 602 for selective longitudinally reciprocating motion with respect thereto between first and second armature positions (shown in the second, raised/upper, armature position in FIG. 6). A poppet 618 is located within the housing 602 and is at least partially located within an armature bore 620 of the armature for selective longitudinally reciprocating motion with respect thereto between first and second poppet positions (shown in the second, raised/upper, poppet position in FIG. 6).

The poppet 618 defines a first valve 622 cooperatively with a first valve seat 624 of at least a portion of the armature bore 620. The poppet 618 at least partially defines a second valve 628 longitudinally spaced from, and oppositely facing, the first valve seat 624. The second valve 628 includes a second valve seat 630 located within the center bore 604 and at least partially spaced apart from a bore wall 632 of the center bore 604. The poppet 618 includes a poppet bore 634 extending longitudinally therethrough and selectively occluded by the first valve 622.

The armature 616, poppet 618, and center bore 604 cooperatively define a damped flow fluid path therebetween. The damped flow fluid path selectively permits fluid communication therethrough from the master cylinder passage 612 to the pedal simulator passage 608. The damped flow fluid path permits fluid communication therethrough when the armature 616 is in the second armature position and the poppet 618 is in the first (lowered) poppet position. Though this is not the situation depicted in FIG. 6 (instead, the poppet 618 is shown raised into the second poppet position), the dashed arrows D schematically depict the approximate damped flow fluid path through the pedal simulator valve 600, if the first valve 622 were to be open.

The armature 616, poppet 618, and center bore 604 also cooperatively define a free fluid path therebetween, with the free fluid flow path shown by solid-line arrows F in FIG. 6. The free flow fluid path selectively permits fluid communication therethrough from the pedal simulator passage 608 to the master cylinder passage 612. The free flow fluid path permits fluid communication therethrough when the armature 616 is in the second armature position and the poppet 618 is in the second poppet position, as shown in FIG. 6.

Figure 7:
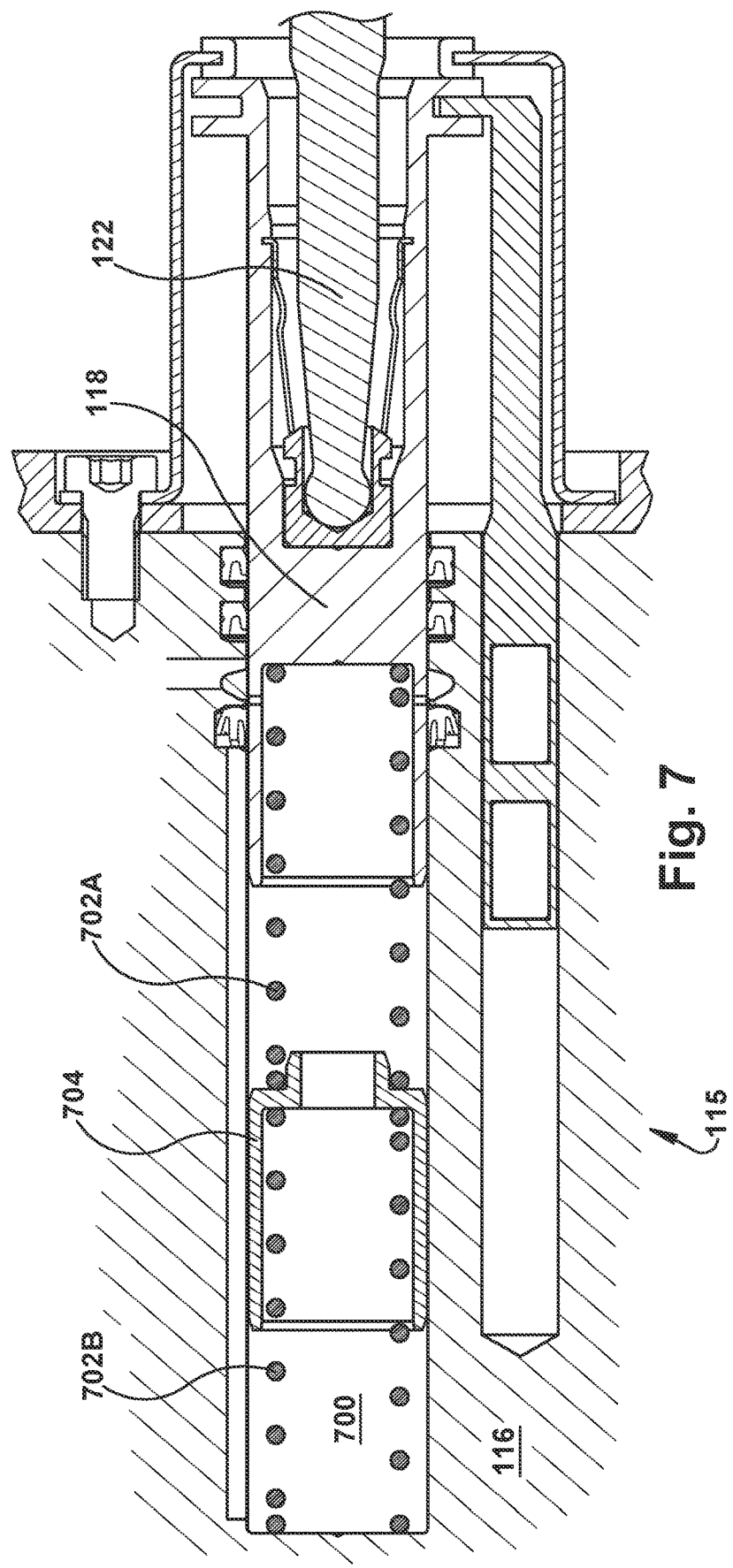
FIG. 7 is a schematic partial side view of a third component suitable for use in a brake system according to any aspect of the present invention.

Turning now to FIG. 7, an example configuration of a suitable master cylinder 115 without an integrated pedal simulator 106 is shown. The master cylinder 115 of FIG. 7 includes a housing 116 defining a longitudinally extending bore 700. The "longitudinal" direction in FIG. 7 is substantially horizontal, and the orientation of that Figure. First and second springs 702A and 702B extend longitudinally within the bore 700. A spring guide 704 is longitudinally interposed entirely between the first and second springs 702A and 702B. As shown, the spring guide 704 could have a substantially "cup-like" shape, to facilitate hydraulic flow therethrough during operation of the master cylinder 115. It is contemplated that the spring guide 704 may reciprocate longitudinally within the bore 700 during at least a portion of the operation of the master cylinder 115 shown in FIG. 7.

When present, the spring guide 704 resists buckling force of the first and second springs 702A and 702B during operation of the master cylinder 115. Stated differently, were the spring guide 704 to be omitted and only a single spring provided to the bore 700 (not shown), that single, relatively long spring 702 would be subject to buckling or shifting during operation, in an undesired manner. One of ordinary skill in the art will be readily able to provide a master cylinder 115 with the spring and guide arrangement depicted in FIG. 7, along with any other desired features suitable to assist operation of the master cylinder 115.

Figure 8:
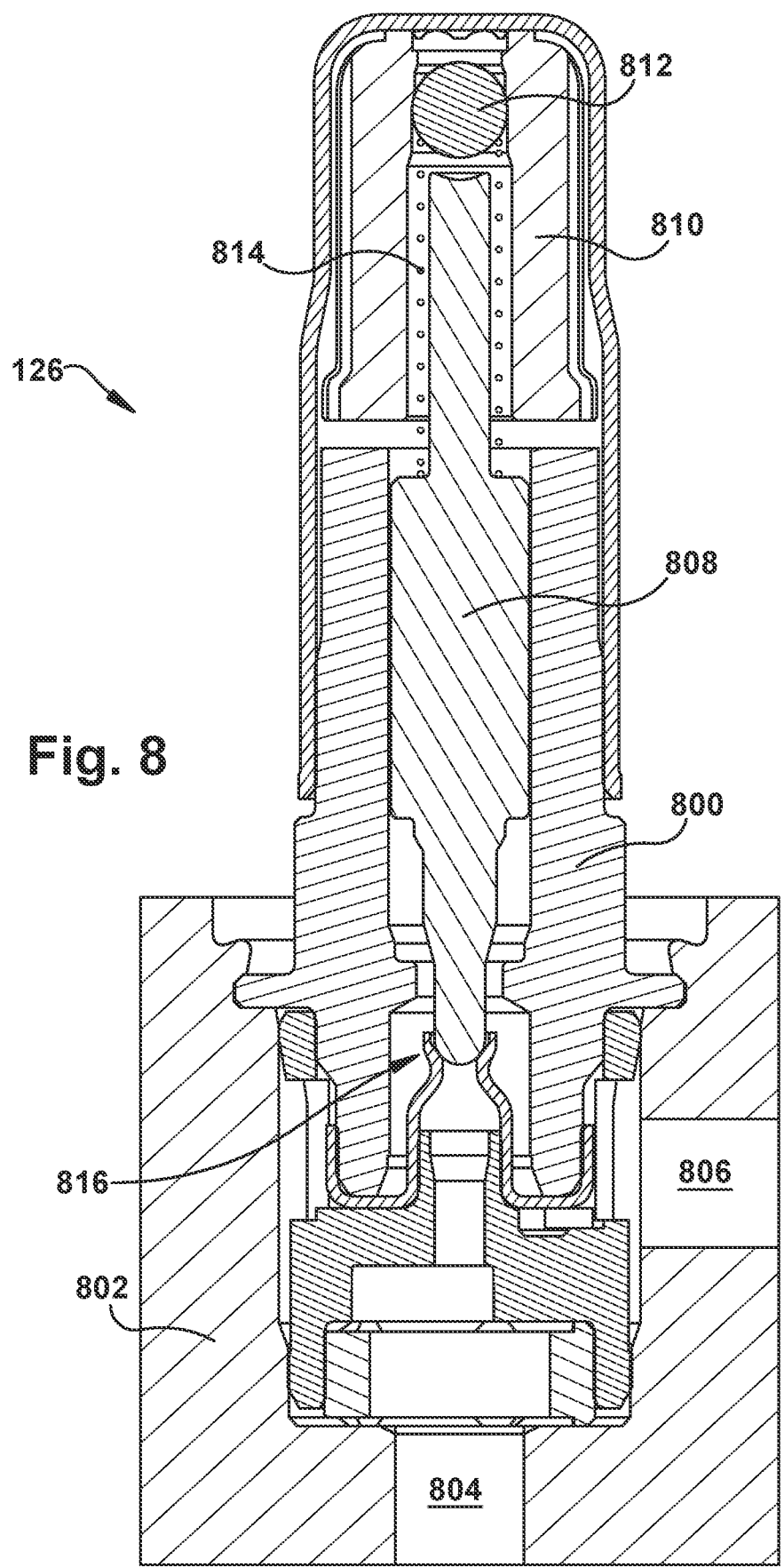
FIG. 8 is a schematic partial side view of a fourth component suitable for use in a brake system according to any aspect of the present invention.

FIG. 8 schematically depicts a simulator test valve 126 which can be used with certain embodiments of the brake system. The simulator test valve 126 shown in FIG. 8 includes a body 800, carried by a housing 802. The housing 802 includes a master cylinder passage 804 and a reservoir passage 806. A tappet 808 reciprocates longitudinally within the body 800 under solenoid-driven actuation by the armature 810. The "longitudinal" direction is substantially vertical, in the orientation of FIG. 8.

A first end of the tappet 808 is configured to selectively engage a ball 812 carried by the armature 810. A test valve spring 814 biases the tappet 808 away from the ball 812. As depicted in FIG. 8, the test valve spring 814 is longitudinally interposed between the tappet 808 and the ball 812. It is contemplated, however, that the ball 812 could instead be longitudinally interposed between the test valve spring 814 and the tappet 808. Regardless of the specific design chosen, the test valve spring 814 biases the simulator test valve 126 toward a closed condition, by pushing the tappet 808 downward, and the orientation of FIG. 8, toward engagement with a seat 816. As a result, the simulator test valve 126 shown in FIG. 8 may help to prevent unwanted leak-down of the reservoir 110, due to a malfunction or failure of the hydraulically driven ones of the wheel brakes 102A, 1028, 102C, and/or 102D, and the release of hydraulic fluid to ground as a result of that unwanted malfunction.

Figure 9:
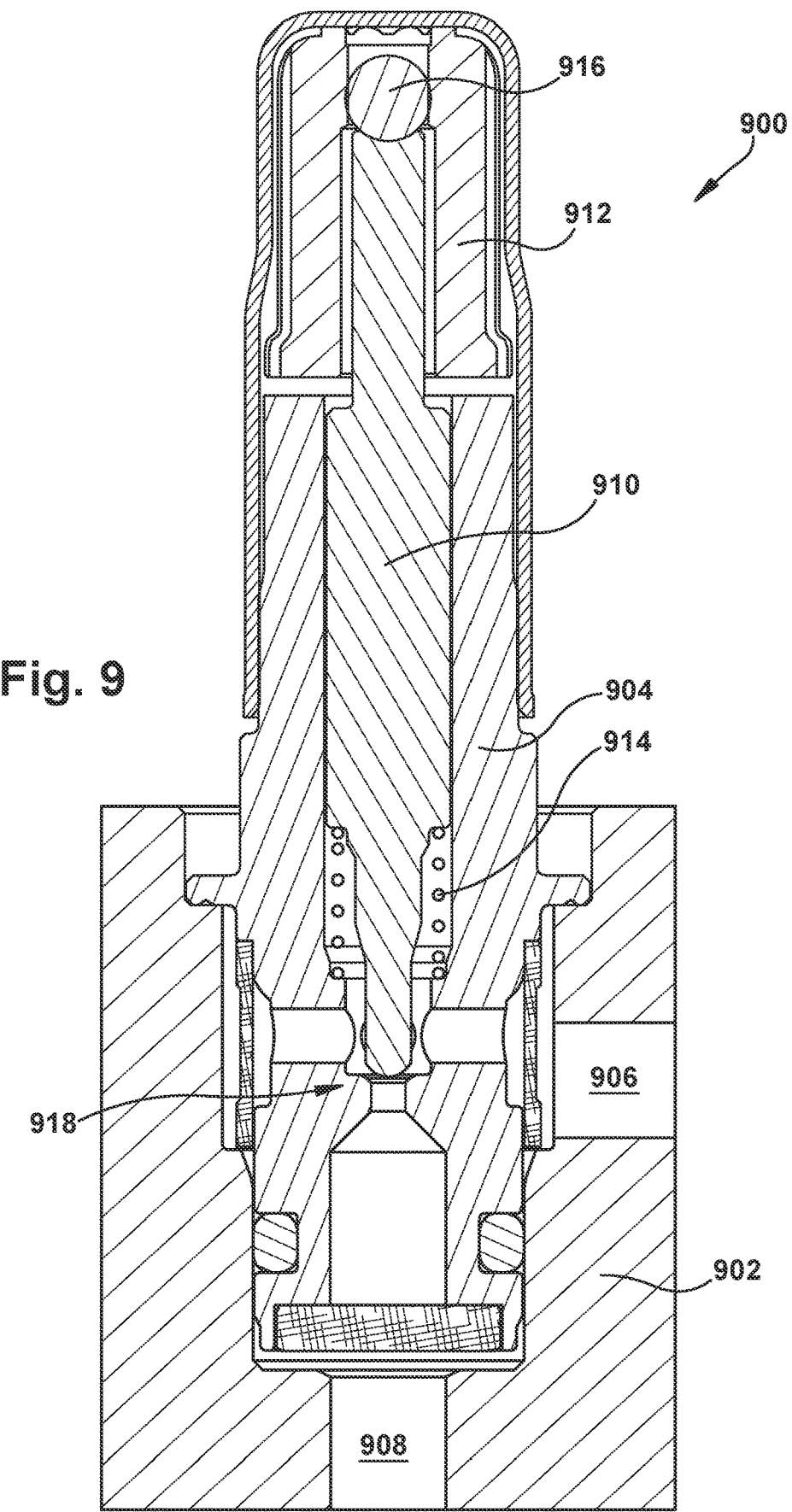
FIG. 9 is a schematic partial side view of a fifth component suitable for use in a brake system according to any aspect of the present invention.

FIG. 9 schematically depicts an isolation valve 900, which may be either of the first and second parallel valves 142 and 144. Here, the isolation valve 900 includes several components which may be similar to those shown and depicted with respect to the simulator test valve 126, discussed above. A housing 902 carries a body 904. The housing 904 includes a first passage 906, for fluid communication with a chosen one of a pressure source (e.g., the master cylinder 115 and/or the power transmission unit 108) and a respective wheel brake 102A, 102B, 102C, or 102D, and a second passage 908 facilitates fluid communication with the other one of the pressure source and the respective wheel brake. A tappet 910 longitudinally reciprocates within the body 904 under influence from an armature 912, which may be solenoid-driven. The "longitudinal" direction is substantially vertical, in the orientation of FIG. 9. A valve spring 914 biases the tappet 910 upward, in the orientation of FIG. 9, and into engagement with a ball 916 carried by the armature 912. As a result, the tappet 910 is biased by the valve spring 914 away from a seat 918, and therefore the isolation valve 900 of FIG. 9 will tend to be open when deenergized.

Figure 10:
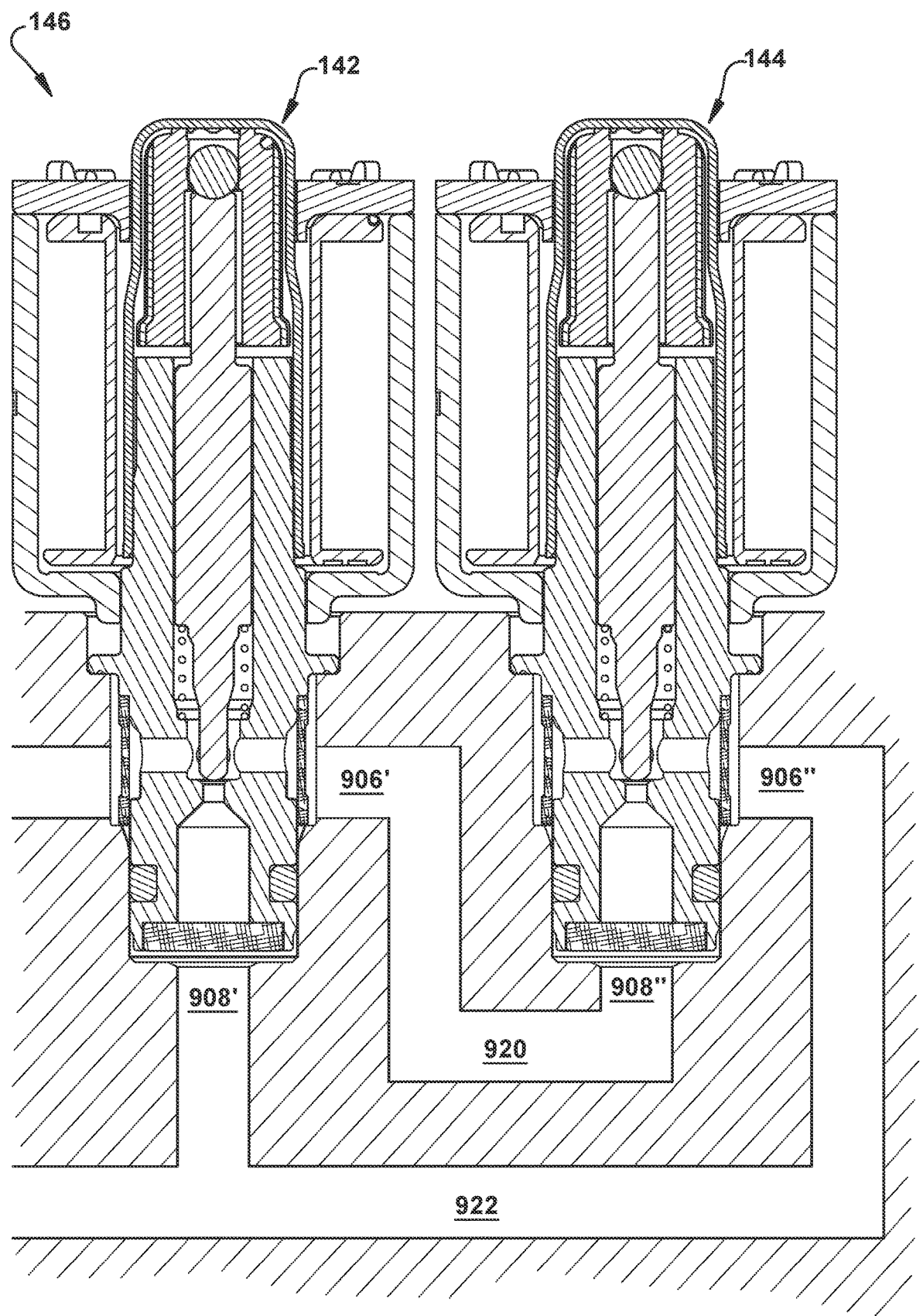
FIG. 10 is a schematic partial side view of the component of FIG. 9 in an example use arrangement.

An arrangement of two isolation valves 900, each substantially similar to that shown in FIG. 9, is shown schematically in FIG. 10. In FIG. 10, the isolation valves are described as being first and second parallel valves 142 and 144, assembled into a multiplex valve arrangement 146. The first and second parallel valves 142 and 144 are each generally operable to two positions, as schematically shown in the Figures.

Prior art multiplex valves tend to be of either a "pressure balanced" or a "brute-force" type. These prior art valves tend to be expensive to manufacture (requiring specialty parts that are not used in other, similar valves of the system), and may require undesirably high current for proper operation of a single valve. In contrast, the multiplex valve arrangement 146 depicted schematically in FIG. 10 includes two valves, each with their own coil for operation. Pressure is equalized across first and second parallel valves 142 and 144, and the total current draw needed to power the solenoids of these two valves is lower than the current draw needed for the unitary multiplex valves taught by the prior art. In addition, due to the modular nature of the multiplex valve arrangement 146, the first and second parallel valves 142 and 144 according to aspects of the present invention can be replaced singly, for cost and time savings, rather than requiring that an entire single-piece multiplex valve the replaced upon malfunction.

The first and second parallel valves 142 and 144 are "reverse plumbed" into the multiplex valve arrangement 146 shown in FIG. 10. That is, a chosen one of the first and second parallel valves 142 or 144 receives input from an output of the other one of the first and second parallel valves 142 or 144. This configuration is depicted schematically in FIG. 10 by use of the first multiplex passage 920 (connecting first passage 906' of first parallel valve 142 with second passage 908" of second parallel valve 144) and the second multiplex passage 922 (connecting first passage 906" of second parallel valve 144 with second passage 908' of first parallel valve 142). In this way, one of the valves will always open when de-energized if a pressure differential exists across the first and second parallel valves 142 and 144. This is true even if a relatively low force spring is used in the first and second parallel valves 142 and 144. After a chosen one of the first and second parallel valves 142 and 144 opens, the other one of the first and second parallel valves 142 and 144 will open if the pressure differential across the valve is allowed to drop below a certain amount based on plunger control. This presumes that the coils of both of the first and second parallel valves 142 and 144 are controlled substantially similarly.

It is contemplated that separate control of the coils can instead be used, in some use environments. For example, the plunger could be controlled to a pressure greater than brake pressure with both of the first and second parallel valves 142 and 144 energized closed. The selected one of the first and second parallel valves 142 and 144 which oriented such that pressure is trying to keep the valve closed can remain energized while the other one of the first and second parallel valves 142 and 144 can be momentarily de-energized such that the pressure may not equalize across the first and second parallel valves 142 and 144 as fluid is applied to the brake. This type of control is also possible with common valve control if the pressure across the selected one of the first and second parallel valves 142 and 144 with pressure trying to keep it closed is not allowed to drop below a certain amount, based on its sealing diameter, spring force, any flow forces on the tappet, or any other desired factors.

Figure 11:
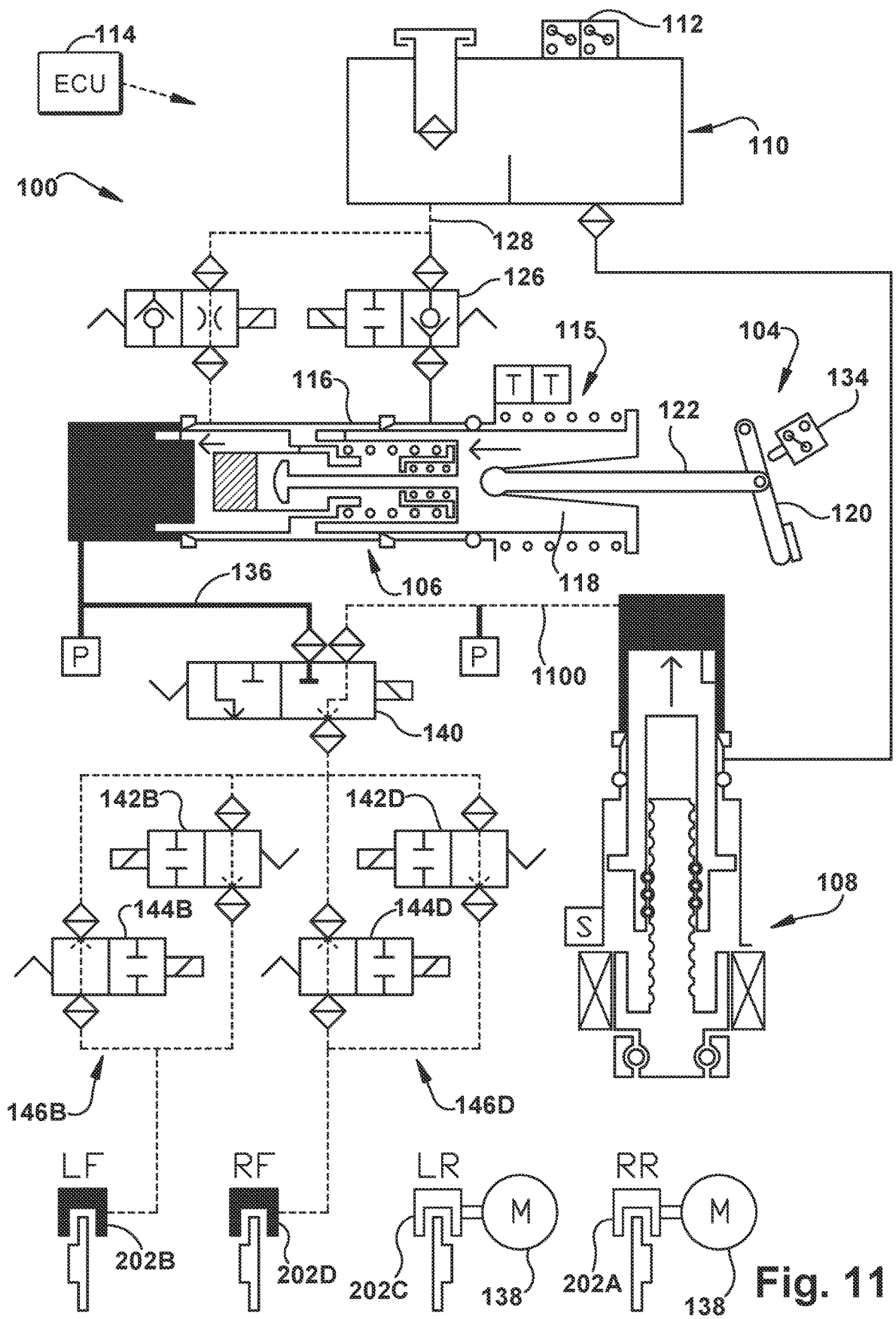
FIG. 11 is a schematic hydraulic diagram of the brake system of FIG. 3 in a second phase of operation.

FIG. 11 schematically depicts a brake system 100 substantially similar to that shown in FIG. 3. In FIG. 11, however, the brake system 100 has been actuated to a boosted braking condition or configuration. The heavy-line or solid-shaded portions of the structures of FIG. 11 are under pressure. For example, the master cylinder 115 is under pressure from the driver's foot, applied via the brake pedal 120. This pressure is pushed through the master cylinder output 136 and is being held at the three way valve 140. The electronic control unit 114 has actuated the motor of the power transmission unit 108, thus placing the power transmission unit 108 under pressure. The electronic control unit 114 has also actuated the rear brake motors 138, to apply the rear wheel brakes 102A and 102C. Front wheel brakes 102B and 102 D are also under hydraulic pressure, as shown by the solid shading in FIG. 11.

The dashed lines in FIG. 11 depict components which are subject to both pressure and fluid flow. For example, hydraulic fluid is flowing from the power transmission unit output 1100, through the three-way valve 140 and into the multiplex valve arrangements 146B and 146D to power the front wheel brakes 102B and 102D in a boosted manner.

In the arrangement of FIG. 11, if traction control or some other type of individual actuation of the front wheel brakes 102B and 102D were to be desired, the first and second parallel valves 142 and 144 of one or both of the multiplex valve arrangements 146B and 146D would be controlled by the electronic control unit 114 to effectuate a desired transfer of hydraulic fluid to or from the respective front wheel brake 102B or 102D. Because of the relatively high responsiveness and robustness of the first and second parallel valves 142 and 144, such individual control can be carried out in a very nimble and accurate manner, to achieve desired performance of the brake system 100.

It is contemplated that the rear wheel brakes 102A and 102C—described herein as being electrically powered—could also or instead be powered hydraulically, rather than electrically. Such an arrangement of the rear wheel brakes 102A and 102C could be facilitated by one of ordinary skill in the art through the provision of suitable hydraulic valves and lines, according to the teachings of the present invention.

It is contemplated that components, arrangements, or any other aspects of the brake system 100 shown and described herein could also or instead be used in the brake systems shown and depicted in co-pending patent applications U.S. patent application Ser. No. 17/1888,363, filed concurrently herewith and titled "Apparatus and Method for Control of a Hydraulic Brake System", and/or U.S. patent application Ser. No. 17/188,288, filed concurrently herewith and titled "Apparatus and Method for Control of a Hydraulic Brake System", both of which are hereby incorporated by reference in their entirety for all purposes.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for actuating a pair of front wheel brakes and a pair of rear wheel brakes, the system comprising:
   a reservoir;
   a master cylinder operable during a manual push-through mode by actuation of a brake pedal connected to the master cylinder to generate brake actuating pressure at a first output for hydraulically actuating the pair of front wheel brakes;
   a power transmission unit configured for selectively providing pressurized hydraulic fluid for actuating the pair of front wheel brakes during a braking event;
   a pair of rear brake motors for selectively electrically actuating respective rear wheel brakes;
   an electronic control unit for controlling at least one of the power transmission unit and the pair of rear brake motors;
   a pedal simulator in selective fluid communication with the master cylinder for providing predetermined brake pedal response;
   a two-position three-way valve hydraulically connected with the master cylinder and the power transmission unit and with the front wheel brakes;

a plurality of arrangements of normally open first and second parallel valves arranged in parallel with one another to provide multiplex control to the pair of front wheel brakes, each of the plurality of arrangements of normally open first and second parallel valves being positioned hydraulically between the three-way valve and a corresponding one of the front wheel brakes, with each of the front wheel brakes having an associated one of the plurality of arrangements of normally open first and second parallel valves, the second parallel valve, of a selected one of the plurality of arrangements of normally open first and second parallel valves, associated with a selected front wheel brake receiving input directly from an output of the first parallel valve, of the selected one of the plurality of arrangements of normally open first and second parallel valves, associated with the selected front wheel brake, each of the plurality of arrangements of normally open first and second parallel valves being in fluid communication with the reservoir only via the three-way valve;

the three-way valve selectively controlling hydraulic fluid flow from a chosen one of the master cylinder and the power transmission unit to at least one of the pair of front wheel brakes via a corresponding one of the plurality of arrangements of normally open first and second parallel valves.

2. The brake system of claim 1, wherein the first and second parallel valves of the plurality of arrangements of normally open first and second parallel valves are identical in configuration to each other.

3. The brake system of claim 1, wherein the multiplex control selectively provides slip control to at least one of the pair of front wheel brakes.

4. The brake system of claim 1, wherein a chosen one of the first and second parallel valves of the plurality of arrangements of normally open first and second parallel valves receives input from the three-way valve and output to a selected one of the pair of front wheel brakes, and the other of the first and second parallel valves of the plurality of arrangements of normally open first and second parallel valves receiving input from the selected one of the pair of front wheel brakes and output to the three-way valve.

5. The brake system of claim 1, including a simulator valve selectively permitting fluid communication between the master cylinder and the pedal simulator, the simulator valve comprising a housing having a center bore extending longitudinally from a first housing surface, the housing including a pedal simulator passage extending therethrough to at least partially place the center bore in fluid communication with the pedal simulator, the housing including a master cylinder passage extending therethrough to at least partially place the center bore in fluid communication with the master cylinder, the master cylinder passage being located longitudinally between the first housing surface and the pedal simulator passage, an armature located at least partially within the housing for selective longitudinally reciprocating motion with respect thereto between first and second armature positions, a poppet located within the housing and at least partially located within an armature bore of the armature for selective longitudinally reciprocating motion with respect thereto between first and second poppet positions, the poppet defining a first valve cooperatively with a first valve seat of at least a portion of the armature bore, and the poppet at least partially defining a second valve longitudinally spaced from, and oppositely facing, the first valve seat, the second valve including a second valve seat located within the center bore and at least partially spaced apart from a bore wall of the center bore, the poppet including a poppet bore extending longitudinally therethrough and selectively occluded by the first valve, wherein the armature, poppet, and center bore cooperatively define a damped flow fluid path therebetween, the damped flow fluid path selectively permitting fluid communication therethrough from the master cylinder passage to the pedal simulator passage, the damped flow fluid path permitting fluid communication therethrough when the armature is in the second armature position and the poppet is in the first poppet position, and wherein the armature, poppet, and center bore cooperatively define a free fluid path therebetween, the free flow fluid path selectively permitting fluid communication therethrough from the pedal simulator passage to the master cylinder passage, the free flow fluid path permitting fluid communication therethrough when the armature is in the second armature position and the poppet is in the second poppet position.

6. The brake system of claim 1, wherein the pedal simulator is integrated into the master cylinder by being at least partially enclosed within a housing of the master cylinder to create an integrated pedal simulator, the integrated pedal simulator being configured to provide a progressive force-versus-travel curve for the brake pedal using a plurality of force-response springs of the pedal simulator.

7. The brake system of claim 1, wherein the master cylinder includes a housing defining a longitudinally extending bore, first and second springs longitudinally extending within the bore, and a spring guide longitudinally interposed entirely between the first and second springs, wherein the guide resists buckling force of the first and second springs during operation of the master cylinder.

8. The brake system of claim 1, wherein the electronic control module is a first electronic control module, the brake system including a second electronic control module, wherein a chosen one of the first and second electronic control modules controls the power transmission unit and the pair of front wheel brakes, and the other one of the first and second electronic control modules controls the pair of rear wheel brakes.

9. The brake system of claim 1, including a bypass valve located fluidically between the three-way valve and the pedal simulator and fluidically between the three-way valve and the master cylinder and having a check valve for preventing low pressure fluid from the master cylinder from passing to the three-way valve.

10. The brake system of claim 1, wherein the three-way valve, the pedal simulator, and the power transmission unit are located remotely from the master cylinder, the reservoir, and the pair of front wheel brakes.

11. The brake system of claim 1, including a simulator test valve located fluidically between the reservoir and the master cylinder, the simulator test valve including a test valve spring biasing the simulator test valve toward a closed condition.

12. The brake system of claim 1, wherein the rear wheel brakes are free of connection to hydraulic fluid lines.

13. The brake system of claim 1, wherein the first and second parallel valves of the plurality of arrangements of normally open first and second parallel valves are both normally open valves, and are selectively energized closed to provide the multiplex control.

* * * * *